United States Patent [19]

Meyers et al.

[11] Patent Number: 5,191,607
[45] Date of Patent: Mar. 2, 1993

[54] RING TONE MUTING WITH DISABLE

[75] Inventors: Hillel A. Meyers, Chicago; Jim Tykal, Streamwood, both of Ill.

[73] Assignee: Motorola, Inc., Schaumburg, Ill.

[21] Appl. No.: 898,357

[22] Filed: Jun. 12, 1992

Related U.S. Application Data

[63] Continuation of Ser. No. 594,463, Oct. 9, 1990, abandoned.

[51] Int. Cl.[5] ............................................. H04M 1/00
[52] U.S. Cl. .................................. 379/421; 379/373; 379/375; 379/252; 379/164
[58] Field of Search ............... 379/421, 372, 373, 374, 379/375, 199, 156, 164, 263, 265, 266, 267, 252, 253, 218, 223

[56] References Cited

U.S. PATENT DOCUMENTS

| | | |
|---|---|---|
| 3,705,959 | 12/1972 | Swanson . |
| 3,852,541 | 12/1974 | Altenberger . |
| 3,896,270 | 7/1975 | Kopec et al. . |
| 4,409,439 | 10/1983 | Gamble ................................ 379/375 |
| 4,446,334 | 5/1984 | Groff .................................... 379/373 |
| 4,459,435 | 7/1984 | Foldvary et al. ..................... 379/373 |
| 4,480,154 | 10/1984 | Klee ..................................... 379/373 |
| 4,876,708 | 10/1989 | Saegusa et al. . |
| 4,947,421 | 8/1990 | Toy et al. ............................. 379/215 |
| 5,005,149 | 4/1991 | Dupillier ............................. 379/373 |

FOREIGN PATENT DOCUMENTS 2-09052 8/1990 Japan .................................... 379/373

OTHER PUBLICATIONS

Positron Industries, Inc. Catalog Sheet I.A.P.-Integrated Answering Position, Jun. 1989.
General Electric Company Catalog Sheet C3 Series Console 16 Plus, Operator's Manual No. LBI-31833A, Jul. 1988.

Primary Examiner—James L. Dwyer
Assistant Examiner—Jason Chan
Attorney, Agent, or Firm—Susan L. Lukasik; Steven G. Parmelee; Raymond A. Jenski

[57] ABSTRACT

A communication control console center, able to receive at least one phone call, has a ring tone mute button (103). To prevent indefinite or permanent muting of ring tones automatic disabling of the ring tone mute circuit is provided by a programmable timer (107). An automatic mute button (111) is presented to automatically disable ring tone muting at call termination.

15 Claims, 3 Drawing Sheets

RING TONE MUTING WITH DISABLE

This is a continuation of application Ser. No. 07/594,463, filed Oct. 9, 1990 and now abandoned.

FIELD OF THE INVENTION

This invention relates generally to radio/telephone system consoles, and particularly to telephone ring tone mute circuits in radio/telephone system consoles.

BACKGROUND OF THE INVENTION

Radio/telephone system consoles are also known as control console centers. Control console centers are commonly employed to control several transceivers from a common location. Generally, the control console enables a dispatcher to integrate and control voice and data communications from both two-way radio channels and telephone lines. Such control console centers typically provide the operator with at least two speakers for transducing audible information. Generally, one speaker (select audio speaker) is used for monitoring a selected communication resource, either a radio or telephone call, and the other speaker (mix speaker) is used for monitoring a mix of nonselected communication resources.

Typically, control console centers are utilized by police and fire departments, airline controllers, utilities service, and emergency 911 operators. Thus, these console centers are usually operated in critical situations that could easily be life-and-death. Operators are continually receiving and making important telephone and radio calls that must not be lost. Elimination of unnecessary background tones in certain situations is obviously beneficial to the users of console centers.

While an operator is involved in a call, ring tones are generated in the select audio speaker (or headset) to indicate an incoming but unanswered call on a (PSTN) phone channel. In order for the operator to maintain his concentration and not to be confused in a crucial situation, he requires the capability to mute the ring tones being generated. However, the operator may forget that he has muted the ring tones, therefore muting the ring tone generation indefinitely or permanently and possibly missing vital calls.

DESCRIPTION OF A PREFERRED EMBODIMENT

The following describes a method and apparatus for a ring tone mute circuit with automatic disable. The automatic disable prevents muting from being indefinite or permanent, because the ring tones will be enabled after a predetermined period of muting or upon call termination, unless the operator again takes action to mute the ring tones. The automatic disable frees the operator from performing this function manually, which is easy to forget in a stressful situation. The preferred embodiment of the invention resides in a CENTRACOM Series II Plus with telephone integration option, available from Motorola, Inc.

Figure 1:
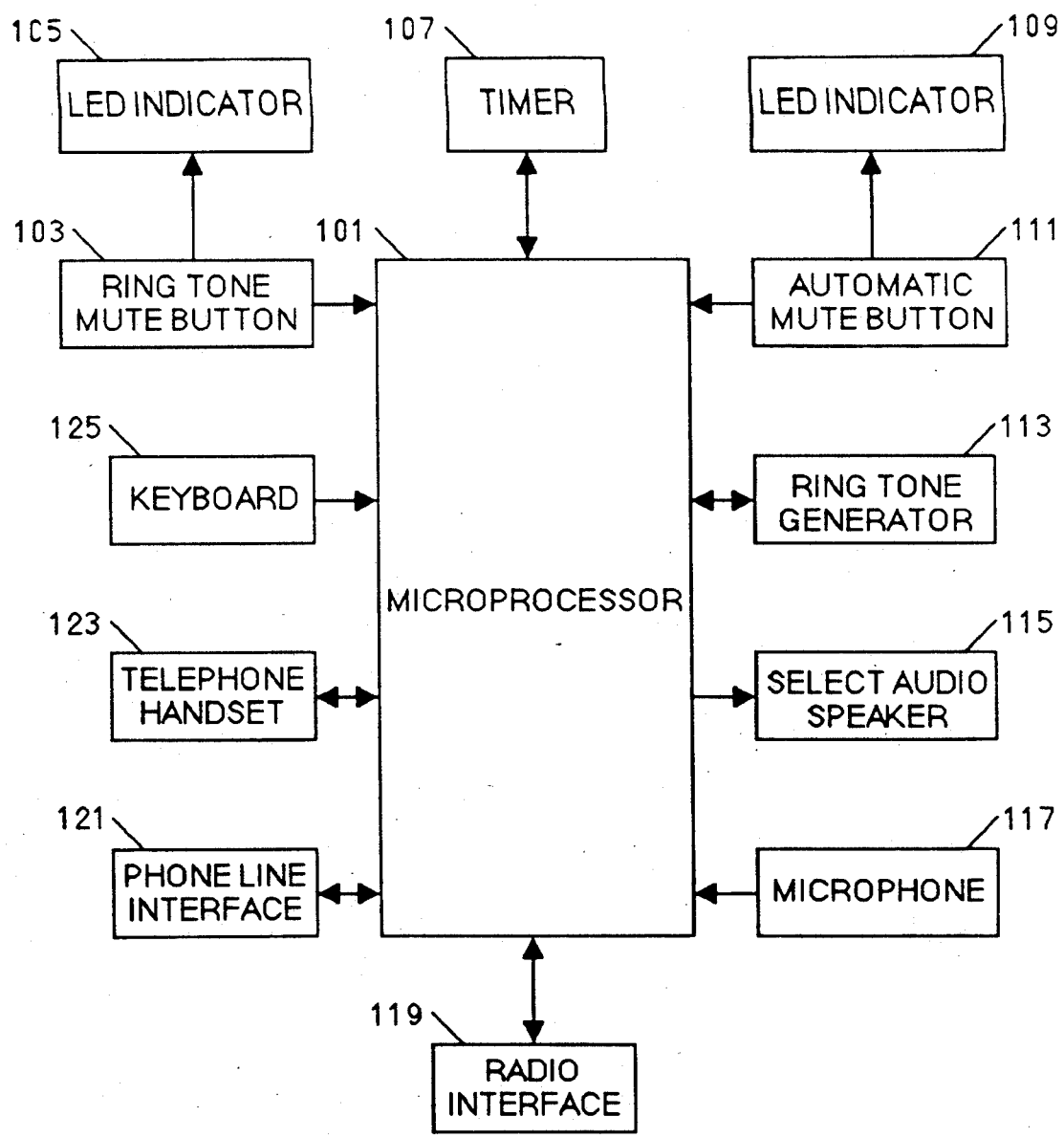
FIG. 1 is a block diagram of a ring tone mute circuit in accordance with the invention.

FIG. 1 is a block diagram of a ring tone mute circuit. The ring tone mute button 103 acts as a toggle switch. Depression of this button 103 is monitored by the microprocessor 101, which deactivates the ring tone generator 113, thereby muting all ring tones to the select audio speaker 115. This does not alter the audio coming out of the select audio speaker 115. Depression of the button 103 when muting is already active triggers the microprocessor 101 to deactivate the muting, thus ring tones are enabled again. In the preferred embodiment of the invention, a programmable time-out is added that also can deactivate the ring disable feature. The time-out length is one of the user programmable parameters entered in a PROM at system installation. Keyboard 125 entry of the time-out length is possible, although it is not done that way in the preferred embodiment. The microprocessor 101, as formatted by the user, starts the timer 107 with a programmed value whenever the ring tone mute is activated. While ring tones are muted, an LED indicator 105 on the ring tone mute button 103 is lit to serve as a visual reminder. Automatic mute mode, when ring tones are automatically muted while the operator is on an active call, is entered by pressing the automatic mute button 111 on the console. While in automatic mute mode, an LED indicator 109 on the automatic mute button 111 is lit to serve as a visual reminder.

Figure 2:
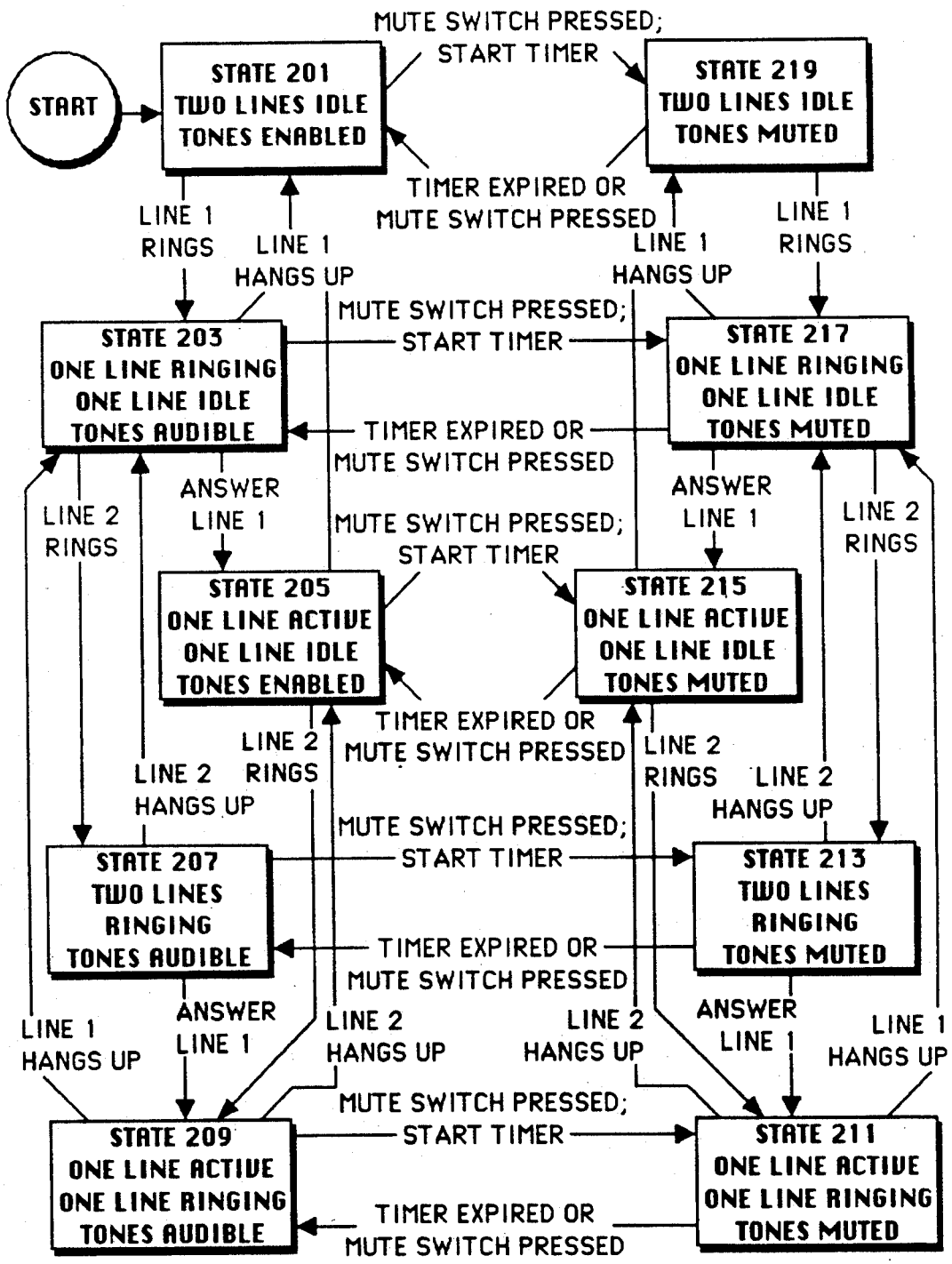
FIG. 2 is a state diagram of mute circuit disablement by time-out in accordance with the invention.

FIG. 2 is a state diagram of mute circuit disablement by time-out in accordance with the invention. For the example shown, there are two phone lines, Line 1 and Line 2, and although the transitions are shown delineating between the two lines, there is no difference in actual operation. The state diagram shows the different states of the system in each block and the event(s) that occur to cause the system to change state. There are ten different states in this system. The five states on the left-hand side of FIG. 2 reflect states when the ring tones are enabled and/or audible. The five states on the right-hand side of FIG. 2 reflect states when the ring tones are muted.

Stepping through the state diagram the process operates as follows. When both lines are idle, state 201, the start-up state, occurs when ring tones are enabled for audible output, and state 219 occurs when ring tones are disabled for audible output. Transition between these states occurs when the mute button is pressed. When changing from state 201 to state 219, the programmable time-out is started. If this timer expires before the mute button is pressed, the state will change from state 219 to state 201. When Line 1 rings, the system changes from state 201 to state 203, when ring tones are audible, or state 219 to state 217, when ring tones are disabled. Transitions between state 203 and state 217 are the same as those between state 201 and state 219 respectively. If Line 1 hangs up before it is answered, the system changes from state 203 to state 201 or state 217 to state 219. When Line 1 is answered, the system changes from state 203 to state 205, when ring tones are enabled, or state 217 to state 215, when ring tones are disabled. Transitions between state 205 and state 215 are the same as those between state 201 and state 219 respectively. When the call on Line 1 is terminated, the system changes from state 205 to state 201 or state 215 to state 219. If Line 2 begins ringing before Line 1 is answered, the system changes from state 203 to state 207, when ring tones are audible, or state 217 to state 213, when ring tones are disabled. Transitions between state 207 and state 213 are the same as those between state 201 and state 219 respectively. If Line 2 hangs up before it is answered, the system changes from state 207 to state 203 or state 213 to state 217. If Line 1 is answered from state 207 or state 213, the system changes to state 209, when ring tones are audible, or state 211, when ring tones are disabled, respectively. Transitions between state 209 and state 211 are the same as those between state 201 and state 219 respectively. If Line 2 begins ringing from state 205 or state 215, the system changes to state 209 or state 211 respectively. If Line 2 hangs up before it is answered, the system changes from state 209 to state 205 or state 211 to state 215. When the call on Line 1 is terminated from state 209 or state 211, the system changes to state 203 or state 217 respectively.

Figure 3:
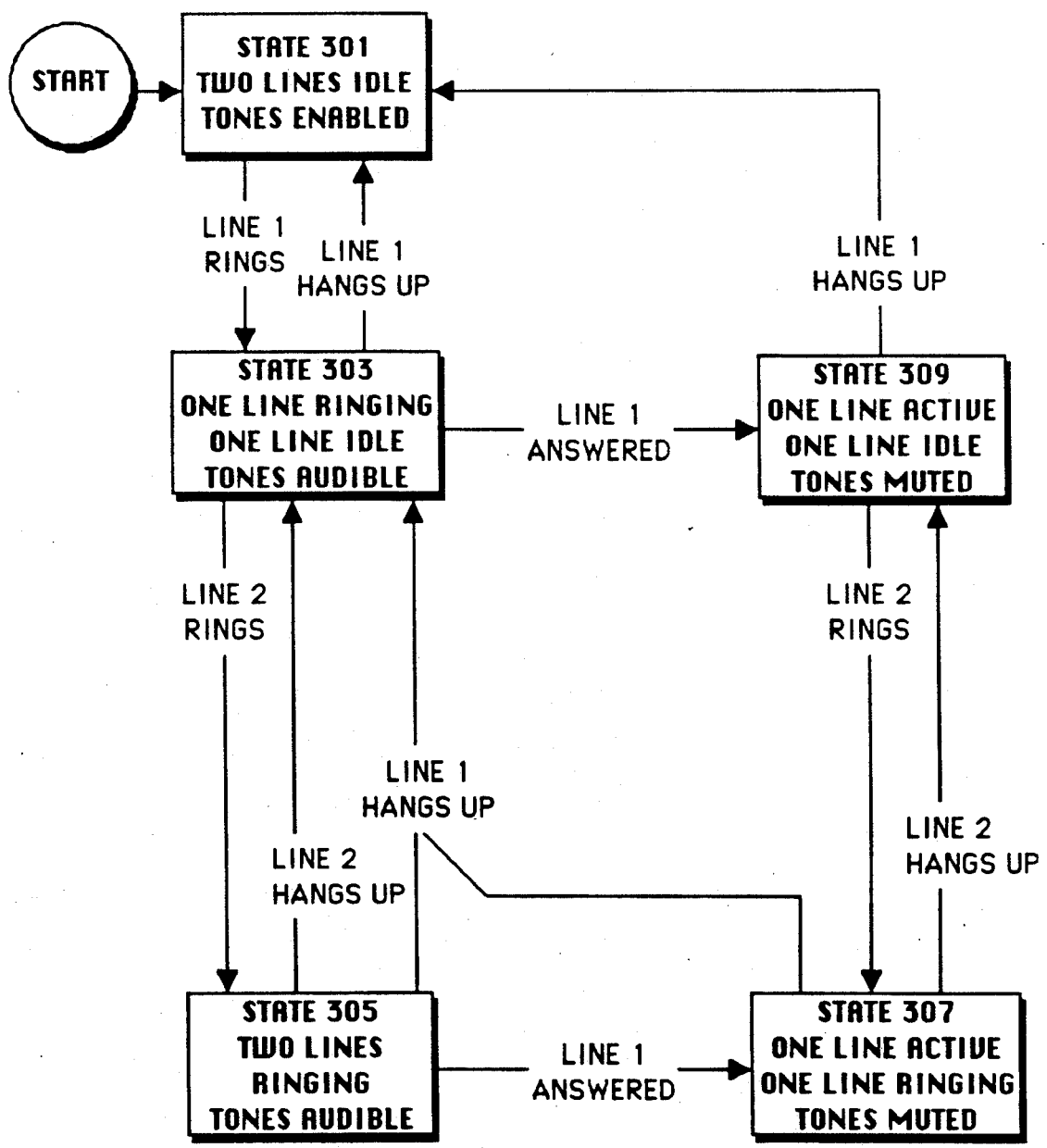
FIG. 3 is a state diagram of mute circuit disablement by phone hang up in accordance with the invention.

As a further enhancement, ring tone muting can be disabled automatically by call termination, i.e., either party hanging up the phone from an answered (active) call. Entering this automatic mute mode enables the ring tone mute circuit while on a call and disengages the ring tone mute circuit after hanging up the phone from the original call. This is shown in FIG. 3, a state diagram of mute circuit disablement by phone hang up. For the example shown, there are two phone lines, Line 1 and Line 2, and although the transitions are shown delineating between the two lines, there is no difference in actual operation. State 301 occurs when both lines are idle; the tones are automatically enabled. When Line 1 rings, the system changes to state 303 when tones are audible. When Line 1 is answered, the system changes to state 309 and the ring tones are automatically disabled. If Line 1 hangs up (or is terminated) from state 303 or state 309, the system reverts to state 301. If Line 2 begins ringing from state 303, the system changes to state 305, when both lines are ringing with audible tones. If Line 1 is then answered, the system changes to state 307 and the ring tones are disabled. State 307 is entered from state 309 when Line 2 begins ringing. If Line 2 hangs up before it is answered, the system reverts to state 303 from state 305 or state 309 from state 307. If Line 1 hangs up (or is terminated) from state 305 or state 307, the system reverts to state 303.

From the point of view of the operator, the present invention is employed as follows. Beginning from a point where no phone lines are ringing, a first line begins to ring. Tones are audible until the line is answered or the calling party hangs up. If the operator answers the line and a second line starts ringing, he can press the mute button 103 on his console and he will not hear the ring tones for a predetermined amount of time. He can wait for the timer 107 to expire or disable the muting by pressing the mute button 103 again. An LED indicator 105 on the ring tone mute button 103 is lit while muting is present as a visual reminder for the operator. The user may choose to enter the automatic mute mode by pressing that button 111 on the console. Ring tones are then automatically muted while the operator is on an active call. If he answers the first call, all ring tones from successive calls are muted until the first call is terminated by either party. If another call is pending, ring tones are immediately generated. If no call is pending, ring tones will be generated when the next call comes in. An LED indicator 109 on the automatic mute button 111 is lit while in automatic mute mode as a visual reminder for the operator. Automatic mute mode is exited by pressing the automatic mute button 111 again. The same procedure applies if the first call comes in on an RF channel.

The preferred embodiment of the invention allows the ring tone mute button 103 to be pressed at any time. For example, a dispatcher engaged in a crucial conversation on an RF channel may press the ring tone mute button 103. Any incoming phone call will have its ring tones muted until the timer 107 expires or the ring tone mute button 103 is pressed again. In the case of automatic mute mode, call termination from the selected RF channel enables the ring tones again.

We claim:

1. A communication control console center, able to receive at least two phone calls, comprising:
   means for receiving a first call;
   means, responsive to said first call, for generating a first set of ring tones;
   means for receiving a second call during said first call;
   means for generating a second set of ring tones responsive to said second call;
   means for answering one of said first call and said second call;
   means for muting said first set of ring tones if said second call is answered, muting said second set of ring tones if said first call is answered, and muting said first set of ring tones and said second set of ring tones if neither said first call nor said second call is answered; and
   means for automatically disabling said means for muting.

2. The communication control console center of claim 1, wherein said means for automatically disabling further comprises means for time setting wherein disabling of said muting occurs after time-out.

3. The communication control console center of claim 2, wherein said means for time setting is programmable.

4. The communication control console center of claim 1, wherein said means for automatically disabling further comprises means for disabling said means for muting ring tones at call termination of said first phone call.

5. The communication control console center of claim 1, further comprising means for receiving radio frequency and landline phone calls.

6. A communication control console center, able to receive at least two phone calls, comprising:
   means for linking a first phone call to the communication control console center;
   means, coupled to said means for linking, for generating a first set of ring tones;
   means for linking a second phone call to the communication control console center while said first phone call is linked;
   means, coupled to said means for linking said second phone call, for generating a second set of ring tones;
   means, responsive to said linking of said second phone call, for muting said generated second set of ring tones; and
   means for disabling said means for muting.

7. The communication control console center of claim 6 wherein said means for disabling further comprises
   means for time setting, wherein disabling of said muting occurs after time-out time-out 8. The communication control console center of claim 6 wherein said means for disabling further comprises means for programmable time setting, wherein disabling of said muting occurs after time-out.

9. The communication control console center of claim 6 wherein said means for disabling further comprises means for disabling said means for muting ring tones at call termination of said first phone call.

10. The communication control console center of claim 6, further comprising means for receiving radio frequency and landline phone calls.

11. A method of automatically disabling muting of ring tones in a communication control console center, comprising:
    receiving a first call;
    generating a first set of ring tones responsive to said first call;
    receiving a second call during said first call;
    generating a second set of ring tones responsive to said second call;
    answering one of said first call and said second call;
    muting said first set of ring tones if said second call is answered, muting said second set of ring tones if said first call is answered, and muting said first set of ring tones and said second set of ring tones if neither said first call nor said second call is answered; and
    automatically disabling said muting.

12. The method of claim 11, wherein said first call and said second call comprise one of a radio frequency call and a landline call.

13. The method of claim 11, wherein said disabling step further comprises the step of time setting, wherein disabling of said muting occurs after time-out.

14. The method of claim 11, wherein said disabling step further comprises the step of programmable time setting, wherein disabling of said muting occurs after time-out.

15. The method of claim 11, wherein said disabling step further comprises the step of disabling said muting of ring tones at call termination of said answered call.

* * * * *

UNITED STATES PATENT AND TRADEMARK OFFICE
CERTIFICATE OF CORRECTION

PATENT NO. : 5,191,607

DATED : March 2, 1993

INVENTOR(S) : Hillel A. Meyers et al.

It is certified that error appears in the above-identified patent and that said Letters Patent is hereby corrected as shown below:

In Column 4, line 66, replace "time-out time-out" with -- time-out. --.

Signed and Sealed this

Sixteenth Day of November, 1993

Attest:

BRUCE LEHMAN

Attesting Officer

Commissioner of Patents and Trademarks